United States Patent [19]

Solarek et al.

[11] Patent Number: 5,523,339
[45] Date of Patent: Jun. 4, 1996

[54] METHOD OF PAPERMAKING USING CROSSLINKED CATIONIC/AMPHOTERIC STARCHES

[75] Inventors: Daniel B. Solarek, Belle Mead; Leroy R. Peek, Milford; Matthew J. Henley, Somerset; Ralph M. Trksak, Manville; Michael T. Philbin, Somerville, all of N.J.

[73] Assignee: National Starch and Chemical Investment Holding Corporation, Wilmington, Del.

[21] Appl. No.: 282,865

[22] Filed: Jul. 29, 1994

Related U.S. Application Data

[62] Division of Ser. No. 997,253, Dec. 23, 1992, Pat. No. 5,368,690.

[51] Int. Cl.⁶ ............................................. C08B 30/00
[52] U.S. Cl. ............................ 524/47; 536/106; 536/124; 536/47
[58] Field of Search ............................ 536/47, 124, 106; 524/47

[56] References Cited

U.S. PATENT DOCUMENTS

| | | | |
|---|---|---|---|
| 3,417,078 | 12/1968 | Patel et al. | 536/47 |
| 5,122,231 | 6/1992 | Anderson | 162/175 |

FOREIGN PATENT DOCUMENTS

| | | |
|---|---|---|
| 0097371 | 1/1984 | European Pat. Off. . |
| 2133695 | 5/1990 | Japan . |

OTHER PUBLICATIONS

D. B. Solarek, *Modified Starches: Properties and Uses,* "Cationic Starches," Chapter 8, pp. 113–129, 1986.(Month Unavailable).

*Primary Examiner*—Jeffrey Mullis
*Attorney, Agent, or Firm*—Eugene Zagarella, Jr.

[57] ABSTRACT

A method of making paper in an alkaline or acid system wherein a selected crosslinked, cationized or amphoteric starch is added to the system, said starch being crosslinked by adding enough crosslinking agent to provide a starch having a breakdown viscosity of from about 2 to 85% and wherein the crosslinked, cationized or amphoteric starch is jet cooked under super atmospheric pressure at a temperature of from about 195° to 325° F.

8 Claims, No Drawings

METHOD OF PAPERMAKING USING CROSSLINKED CATIONIC/AMPHOTERIC STARCHES

This application is a division of application Ser. No. 07/997,253, filed Dec. 23, 1992 now U.S. Pat. No. 5,368,690.

BACKGROUND OF THE INVENTION

This invention relates to an improved method of papermaking in an acid or alkaline system using a selected crosslinked, cationic or amphoteric, jet cooked starch as a wet end additive.

The term "paper," as used herein, includes sheet-like masses and molded products made from fibrous cellulosic material, which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that the water is removed, thereby forming a sheet of the consolidated fibers, which upon pressing and drying can be processed into dry roll or sheet form. Two well known papermaking operations involve the Fourdrinier machine, the most common, and the cylinder machine. In the Fourdrinier and multicylinder operations, and in other machine operations, as typical in papermaking, the feed or inlet to the machine is an aqueous slurry or water suspension of pulp fibers which is provided from what is called the "wet end" system. In the wet end, the pulp along with other additives are mixed in an aqueous slurry and subject to mechanical and other operations such as beating and refining to improve interfiber bonding and other physical properties of the finished sheet. Additives commonly introduced along with the pulp fibers are pigments such as titanium dioxide, mineral fillers such as clay and calcium carbonate and other materials introduced into paper to achieve such properties as improved brightness, opacity, smoothness, ink receptivity, fire retardance, water resistance, increased bulk, etc.

Starch has been used in the paper industry for many years and in fact, is the second largest volume raw material component in paper. Starches perform two of the most important items required in papermaking; strength improvement and increased drainage on the wire. Both unmodified and modified types have been used. However, due to the complexity of today's pulp furnishes, the sizing chemicals and other chemicals present, cationic modified starches are preferred since they are retained to a high degree by the paper machine furnish.

Various cationic starches are known and used in the paper industry with the tertiary amino and quaternary ammonium starch ethers being the most commercially significant derivatives. These and other cationic starches as well as the method of preparing them are described in "Cationic Starches" by D. B. Solarek, *Modified Starches: Properties and Uses*, Chapter 8, pp. 113–129, 1986.

Crosslinking is known to affect both the textural and viscosity properties of starch. It strengthens and helps hold the starch granules together. While the crosslinking of starch, either by itself or in combination with other starch modifications, has been used in a number of applications, it has not been used to a large extent in papermaking. An early patent, U.S. Pat. No. 3,417,078 issued Dec. 17, 1968 to C. Patel discloses the use of a cationic starch in the manufacture of paper, the starch being a selected imidazoline derivative which is also reacted with a crosslinking agent such as dichlorobutene. Another patent publication, EPO 097,371 published Jan. 4, 1984 to S. Frey discloses the use of nongelatinized starch which is cationized and partly crosslinked in a papermaking process.

Two recent patents further disclose the use of cationized/crosslinked starches in papermaking processes. U.S. Pat. No. 5,122,231 issued Jun. 16, 1992 to K. Anderson discloses an improved method of papermaking wherein a cationic starch is subsequently crosslinked after cationization and then added to the wet end of the papermaking system to provide increased starch loading capacity. Japanese Patent Disclosure No. 2-133695, published May 22, 1990 to K. Maeda discloses a method of making paper wherein a cationic crosslinked starch having specified but broad degrees of crosslinking and cation substitution are used.

While the general applicability of using crosslinked, cationized starch in papermaking has been disclosed previously as noted above, the capability of providing significant process improvement was not demonstrated.

SUMMARY OF THE INVENTION

Now, in accordance with this invention it has been found that the use of a selected crosslinked, cationic or amphoteric, jet cooked starch as an additive in the wet end of a papermaking process provides significant and unexpectedly improved process performance.

More particularly, this invention relates to a method of making paper having a pH of about 4.5 or more comprising adding a crosslinked, cationized or amphoteric starch to the wet end of the system wherein the starch has been crosslinked by adding enough crosslinking agent to provide a starch having a percent breakdown viscosity of from about 2 to 85% and wherein the crosslinked, cationized or amphoteric starch has been jet cooked under super atmospheric pressure at a temperature of from about 195° to 325° F.

DETAILED DESCRIPTION OF THE INVENTION

The crosslinked starch used in the invention may include starch which is treated with a number of multifunctional crosslinking agents such as disclosed in "Starch Derivatives: Production and Uses" by M. Rutenberg and D. Solarek, *Starch: Chemistry and Technology*, Chapter X, pp. 324–332, 1984. Such crosslinking agents include bifunctional etherifying and/or esterifying agents such as epichlorohydrin, bis-β-chloroethyl ether, dibasic organic acids, phosphorus oxychloride, trimetaphosphate (i.e., the alkali and alkaline earth metal salts), linear mixed anhydrides of acetic and di- or tribasic carboxylic acids. Another useful crosslinking agent is sodium hypochlorite, which when used in the proper amount and under proper pH conditions (11 or more) provides crosslinked starch. Preferred crosslinking agents are epichlorohydrin, phosphorus oxychloride, adipic-acetic anhydrides and sodium trimetaphosphate, with epichlorohydrin being most particularly preferred.

An important feature of this invention is the amount of crosslinking that the starch receives, i.e., the amount of treatment or the degree of crosslinking. It is difficult to measure this characteristic of the treated starch. Molecular weight of crosslinked starch is not only difficult to measure but is subject to variations due to a lack of standard test procedure. One of the best ways to determine the amount of crosslinking which has been provided to the treated starch is to measure the viscosity of the starch. It is well known in the art to measure the viscosity of crosslinked starch using a C. W. Brabender viscoamylograph. We have found that a good way to relate the amount of crosslinking needed to provide improved process performance is to measure the viscosity using a C. W. Brabender Viscoamylograph and determine the % breakdown viscosity using the following formula:

$$\% \text{ Breakdown Viscosity} = \frac{\text{Peak Viscosity} - \text{Viscosity at 95° C. after 30 minutes}}{\text{Peak Viscosity}} \times 100$$

Using this formula, it was determined that significantly improved performance in papermaking was provided when the starch was treated with enough crosslinking agent to provide a % breakdown viscosity of from about 2 to 85%, preferably from about 2 to 60% and more preferably from about 5 to 50%.

The starches used in this invention besides being crosslinked also are cationically or amphoterically treated. Cationization of the starch can be produced by well known chemical reactions with reagents containing amino, imino, ammonium, sulfonium or phosphonium groups as disclosed, for example, in Solarek, "Cationic Starches", supra, and in U.S. Pat. No. 4,119,487 issued Oct. 10, 1978 to M. Tessler. Such cationic derivatives include those containing nitrogen containing groups comprising primary, secondary, tertiary and quaternary amines and sulfonium and phosphonium groups attached through either ether or ester linkages. The preferred derivatives are those containing the tertiary amino and quaternary ammonium ether groups.

The general method for preparing starches containing tertiary amine groups, which method involves reacting starch under alkaline conditions with a dialkylaminoalkyl halide is described in U.S. Pat. No. 2,813,093 issued on Nov. 12, 1957 to C. Caldwell, et al. Another method therefore is disclosed in U.S. Pat. No. 4,675,394 issued Jan. 23, 1987 to D. Solarek, et al. The primary and secondary amine starches may be prepared by reacting the starch with aminoalkyl anhydrides, amino epoxides or halides, or the corresponding compounds containing aryl in addition to the alkyl groups.

Quaternary ammonium groups may be introduced into the starch by suitable treatment of the tertiary aminoalkyl ether of starch, as described in the previously noted U.S. Pat. No. 2,813,093. Alternatively, quaternary groups may be introduced directly into the starch by treatment with the reaction product of an epihalohydrin and a tertiary amine or tertiary amine salt, to provide for example, (3-timethylammonium chloride)-2-hydroxypropyl ether substituent groups as disclosed in the noted U.S. Pat. No. 4,119,487. The above noted patents, i.e., '487, '093 and '394 are incorporated herein by reference.

The preparation of cationic sulfonium derivatives is described in U.S. Pat. No. 2,989,520 issued June, 1961 to M. Rutenberg, et al. and essentially involves the reaction of starch in an aqueous alkaline medium with a beta-halogenoalkylsulfonium salt, vinylsulfonium salt or epoxyalkylsulfonium salt. The preparation of cationic phosphonium derivatives is disclosed in U.S. Pat. No. 3,077,469 issued Feb. 12, 1963 to A. Aszalos and involves reaction of starch in an aqueous alkaline medium with a beta-halogenoalkylphosphonium salt.

Other suitable cationic starches may be provided using reagents and methods that are well known in the art as illustrated in the above noted references. Further description of useful cationic starches are disclosed in U.S. Pat. No. 2,876,217 issued Mar. 3, 1959 to E. Paschall, U.S. Pat. No. 2,970,140 issued Jan. 31, 1961 to C. Hullinger, et al., U.S. Pat. No. 5,004,808 issued Apr. 2, 1991 to M. Yalpani, et al., U.S. Pat. No. 5,093,159 issued Mar. 3, 1992 to J. Fernandez, et al., and EP 406 837 published Jan. 1, 1991 (corresponding to U.S. application Ser. No. 516,024 filed Apr. 26, 1990), all of which are incorporated herein by reference. Particularly useful cationic derivatives are those containing amino or nitrogen groups having alkyl, aryl, aralkyl or cyclic substituents of up to 18 carbon atoms and especially alkyl of 1 to 6 carbon atoms.

The amount of cationic substituent on the starch can be varied and generally a degree of substitution (DS) of from about 0.005 to 0.2 and preferably from about 0.01 to 0.05 will be used. While larger amounts of cationic substituents or higher degrees of substitution (DS) could be used, they are more costly and difficult to make and therefore not economically attractive. The term "degree of substitution" (DS) as used herein means the average number of sites or substituent groups per anhydroglucose unit of the starch molecule.

The selected modified starches which are used may be amphoteric instead of cationic. Dual treatments of starch with cationic and anionic modifying reagents have been used to prepare amphoteric derivatives for use in different applications including as wet end additives in paper manufacture. Cationic modification, particularly tertiary amino or quaternary ammonium etherification of starch, typically prepared by treatment with 2-diethylaminoethyl chloride, epoxypropyltrimethylammonium chloride and 4-chloro-2-butenyltrimethylammonium chloride has been combined with further substitution with phosphate, phosphonate, sulfate, sulfonate or carboxyl groups. These and other amphoteric starches and the method of preparation thereof have been disclosed in Solarek, "Cationic Starches", supra, pp. 120–121 and in U.S. Pat. Nos. 3,459,632; 3,562,103 and 4,876,336 which are incorporated herein by reference.

The starch which may be used as the base material in preparing the modified starch material of this invention may be derived from any plant source including corn, potato, sweet potato, wheat, rice, waxy rice, sago, tapioca, waxy maize, sorghum, high amylose starch such as high amylose corn, etc. Also included are the conversion products derived from any of the former bases including, for example, dextrins prepared by the hydrolytic action of acid and/or heat; oxidized starches prepared by treatment with oxidants such as sodium hypochlorite; and fluidity or thin-boiling starches prepared by enzyme conversion or mild acid hydrolysis. The starch base may be a granular starch or a gelatinized starch, i.e., non-granular starch.

Besides the need to control the amount of crosslinking in the modified starch of this invention, an essential feature is the necessity to subject the crosslinked, cationic or amphoteric starch to a jet cooking operation prior to its use in papermaking. While the need for cooking starch prior to use in wet end applications is known, the use of either batch or jet cooking has been considered satisfactory for this purpose. Although batch cooking is useful, it is a slower, more labor intensive and more costly operation. Jet cooking, on the other hand, provides a continuous, automatic and convenient method, however, it has not generally been known to improve starch performance in papermaking, particularly retention properties. In fact, performance in many instances even decreases, especially under more severe conditions. It has now been surprisingly and unexpectedly found that using the particular modified starch of this invention wherein the starch is crosslinked to a specified amount, the performance of the starch in the method of making paper, can be significantly improved by jet cooking rather than batch cooking the starch.

Jet cooking or continuous cooking is a conventionally known starch solubilization process and as used herein is a method of instantly and continuously heating starch using direct steam injection under shear and pressure to thoroughly disperse and cook the starch. The method is carried out in a closed system, where typically, a slurry of starch is pumped through a chamber into which pressurized steam is injected to raise the temperature and impart mechanical shear to the paste. Gelatinization and pasting of the starch occurs in a very short period of time (a few seconds) and because of the rapid and instantaneous heating, mixing and shear that is applied, the granular structure of the starch is destroyed and it becomes fully dispersed. Optionally, a retention tube or coil may be used to hold the starch paste at an elevated temperature for a longer time (up to several minutes or longer) if desired. It is generally recognized that shear can be added or controlled in the jet cooker by varying conditions such as temperature, pressure, flow rate, solids content of starch slurry and equipment configuration such as baffles and mixing devices within the cooking chamber. Retention time within the cooking chamber will generally be a very short duration of usually less than 1 minute and more particularly less than 10 seconds.

The conditions generally used in preparing the starch are steam injection cooking at a sufficient high temperature and super or above atmospheric pressure to fully disperse or solubilize the starch, i.e., a temperature of at least 195° F., more particularly about 215° to 325° F. and preferably from about 220° to 250° F., and a pressure of at least 5 psi, more particularly from about 15 to 100 psi and preferably from about 20 to 40 psi. The starch concentration in the cooking chamber should be at least 3% and preferably from about 3 to 7% solids.

In preparing the crosslinked, cationic or amphoteric starch of this invention the sequence of steps for introducing the cationic or amphoteric groups and crosslinking may be varied. That is, either the cationic or amphoteric group may be introduced first, or crosslinking may be performed before the cationic or amphoteric group is introduced. Alternatively, the different groups may be added simultaneously. It has been found that when using the selected starch of this invention, which has been crosslinked to a certain degree and then jet cooked, the level of performance in papermaking is not affected by the sequence of crosslinking and adding cationic or amphoteric groups.

The modified starch additive of this invention may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical, chemiground wood, ground wood or any combination of these fibers. Fibers of the viscose rayon or regenerated cellulose type may also be used if desired.

Any desired inert mineral fillers may be added to the pulp which is to be modified with the improved starch derivatives of this invention. Such materials include clay, titanium dioxide, talc, calcium carbonate, calcium sulfate and diatomaceous earths. Rosin may also be present, if desired.

Other additives commonly introduced into paper may be added to the pulp or furnish, for example, dyes, pigments, sizing additives, alum, anionic retention aids, etc.

The amount of modified starch derivative, i.e., crosslinked, cationic or amphoteric, jet cooked starch, that may be added to the wet end or paper pulp will be an effective additive amount. More particularly, from about 0.05 to 5% of the starch derivative, and preferably from about 0.1 to 2%, by weight based on the dry weight of the pulp will be used.

In addition to the selected starch derivative and other components that may be included in the alkaline papermaking system as described above, colloidal inorganic minerals may be added to the system to form an alkaline microparticle system. Such microparticle systems include colloidal silica, bentonite and anionic alum and may be incorporated into the system in amounts of at least 0.001% and more particularly from about 0.01 to 1% by weight based on the weight of dry pulp. Further description of such microparticle inorganic materials may be found in U.S. Pat. No. 4,388,150 issued Jun. 14, 1983; U.S. Pat. No. 4,643,801 issued Feb. 17, 1987; U.S. Pat. No. 4,753,710 issued Jun. 28, 1988 and U.S. Pat. No. 4,913,775 issued Apr. 3, 1990; all of which are incorporated herein by reference.

The following examples will further illustrate the embodiments of this invention. In these examples all parts are given by weight and all temperatures in degrees Celsius unless otherwise noted.

EXAMPLE I

Waxy corn starch (1000 g) was slurried in 1500 cc water, 150 g of 4% sodium hydroxide added and the slurry heated to 40° C. One hundred (100) g of a 50% aqueous solution of diethylaminoethyl chloride hydrochloride (DEC) was added while maintaining the pH at 11.5 with 4% sodium hydroxide. The mixture was reacted overnight at 40° C. then split into three parts and each part was reacted with a different amount of epichlorohydrin: 0.002, 0.004 and 0.006% at 40° C. for 16 hours. Samples were neutralized to 6.0 pH, filtered, washed with water (two parts water per part of starch) and dried.

The samples were cooked in a mini-jet cooker (scaled down jet cooker to simulate a commercial jet cooker) at a temperature of 220°–250° F. and pressure of 20 to 30 psi prior to testing. The mini-jet cooker had a cooking chamber capacity or volume of 0.00133 gal (5.0 ml). The starch was typically slurried at 4 to 6% solids and was passed through the mini-jet cooker at a flow rate of about 0.034 gal/min (130 ml/min) with a retention time therein of about 2.3 seconds. The slurry was heated to a temperature noted above using controlled live steam injection.

The various samples were evaluated in alkaline dynamic retention at 10 lbs/ton addition level vs. a waxy corn starch reacted with diethylaminoethyl chloride hydrochloride. The retention test was a modified Dynamic Retention Evaluation using a Britt Jar (modified TAPPI T26 pm 79 method) with the following procedure.

A standard papermaking furnish was prepared using a pulp stock which comprised an aqueous slurry of bleached hardwood kraft pulp (BHWK) and bleached softwood kraft pulp (BSWK). The pulp stock (80:20 BHWK:BSWK, % by weight) was refined in an aqueous solution to about 400 CSF (Canadian Standard Freeness) and a pH of 7.8–8.2 and contained precipitated calcium carbonate filler (30%) with 8–10% fiber fines and total fines of 37–42%.

The test was run while mixing and agitating using a Britt Jar with a screen having holes 76 microns in diameter in the following manner.

A sample of between 750–1000 ml pulp stock was placed in the jar and agitated at about 800 rpm. Alum, 10 lb/ton (0.5%) was added and mixed at 800 rpm for one minute and then the mixing was increased to 1000 rpm. The starch, 10 lb/ton (0.5%) was then added and mixing continued for another minute. After the addition/mixing sequence, a sample was collected by removing the clamp. The sample was acidified with sulfuric acid to solubilize the calcium carbonate and then filtered onto tared filter paper to recover the fine solids. A standard titration was run by adding Eriochrome Black "T" indicator and titrating with 0.1 N EDTA (ethylene diamine tetra-acetic acid, disodium salt) standard solution to a blue endpoint, using a calibrated burette. Identical titrations were made on an acidified portion of the starting pulp sample and a 25 ml sample of 100 ppm hardness water used and with this information the percent retention of $CaCO_3$ was determined using the following formula:

$$\% \; CaCO_3 \; Retention = \frac{(P-W)-(S-W)}{(P-W)} \times 100$$

where

P is ml EDTA for pulp stock

W is ml EDTA for raw water blank

S is ml EDTA for sample

The results are given below in Table 1.

TABLE 1

| SAMPLE | % EPICHLORO-HYDRIN | % CALCIUM CARBONATE RETENTION | % OF CONTROL |
|---|---|---|---|
| Control | — | 17.7 | 100 |
| A | 0.002 | 22.6 | 127 |
| B | 0.004 | 22.9 | 129 |
| C | 0.006 | 21.9 | 124 |

Improved performance in terms of calcium carbonate retention is demonstrated for the jet cooked crosslinked starches at the different levels over the starch control which was not crosslinked.

EXAMPLE II

This example illustrates the use of various starch bases and shows the importance of the cooking method used to prepare dispersions of cationic, crosslinked starch for use in papermaking.

The starches were prepared using the following general method. Starch was slurried in water (1 part starch/1.5 parts water) and 0.6–0.8% sodium hydroxide, based on weight of starch, was added as a 4% solution. The slurry was heated to 40°–45° C. and 3.1–4.7% (3-chloro-2-hydroxypropyl) trimethyl ammonium chloride was added as a 65% aqueous solution. After 12–16 hours reaction at 40°–45° C., the reactions were split into equal parts and reacted further with varying amounts of epichlorohydrin at 40°–45° C., 11.3–11.7 pH, 12–16 hours. Work up involved neutralizing the starch to 6.0 pH with HCl, filtering, washing the cake with two parts water per part of starch and drying.

Starches were cooked using either a boiling water bath (BWB) to simulate batch cooking or mini-jet cooker (Jet) to simulate commercial jet cooking, and evaluated for alkaline dynamic pigment retention using the procedure of Example I with the results given below in Table 2. The boiling water bath (BWB) cooking method involved slurrying the starch (1% solids) in an agitated or stirred beaker or container which is placed in a water bath tank. Heating was provided to a temperature of about 200°–212° F. by electric means (electric heating coil) immersed in the water bath with stirring and heating continued for about five minutes until the gel point and heaviest viscosity (peak viscosity) is past. The starch is allowed to remain in the boiling water for another 25 minutes to insure complete dispersion. After this time, it is removed and immediately placed into a cold water bath to simulate quenching. The procedure of jet cooking using the mini-jet cooker was the same as described in Example I.

TABLE 2

| SAMPLE | STARCH BASE | % EPI-CHLORO-HYDRIN | COOK TYPE | % PCC[1] RETEN-TION | % OF CON-TROL |
|---|---|---|---|---|---|
| A | Tapioca | 0.005 | BWB | 22.5 | 110 |
| A-1 | Tapioca | 0.005 | Jet | 29.4 | 143 |
| B | Corn | 0.006 | BWB | 19.2 | 94 |
| B-1 | Corn | 0.006 | Jet | 28.4 | 139 |
| C | Potato | 0.006 | BWB | 21.1 | 105 |
| C-1 | Potato | 0.006 | Jet | 31.8 | 155 |
| Control | Waxy Corn[2] | — | BWB | 20.5 | 100 |

[1]PCC = precipitated calcium carbonate
[2]Control starch is a quaternary ammonium waxy corn When using the boiling water bath (BWB) comparable or slightly improved performance to the uncrosslinked control is obtained. However, using the jet cooked cationic, crosslinked starches, significantly higher performance over the control was demonstrated showing the importance of the cooking method.

EXAMPLE III

This example illustrates the affect that the amount of crosslinking has on the performance of starches in alkaline papermaking. A viscosity method for controlling the amount of crosslinking is described.

Waxy corn starch (6000 g) was slurried in 9000 cc of water, followed by 0.8% sodium hydroxide (by wt. of starch) added as a 4% solution. The slurry was heated to 45° C. and 4.7% (dry basis of starch) of (3-chloro-2-hydroxy-propyl trimethylammonium chloride (Quab 188, Degussa Corporation, 65% solids) was added while maintaining the slurry pH between 11.0–11.7 using periodic additions of 4% sodium hydroxide. After 16 hours reaction time, the slurry was split into 10 equal parts and varying amounts of epichlorohydrin was added to each part as shown in the table. The epichlorohydrin crosslinking reactions were allowed to proceed under the same conditions as described above. Samples were neutralized to 6.0 pH, filtered, washed with water (two parts water per part of starch) and dried. Cationic nitrogen substitution was 0.32%. Samples 1–10 and 19 were prepared in this manner and are listed in Table 3. Samples 11–18 were prepared according to the following method. Eight individual slurries were made by mixing 300 g of waxy maize starch into 450 ml water. A sodium hydroxide solution 188.9 g (21.6% w/w) was mixed with 184.3 g of aqueous solution (65.1%) of (3-chloro-2-hydroxypropyl) trimethylammonium chloride. This solution was split into eight portions (46.7 g each) and added to each starch slurry. Then, 0.02–0.09% epichlorohydrin, by weight of starch, was immediately added to each reaction. All the slurries were allowed to react at 40° C. for 16 hours and were worked up as described above. Cationic nitrogen was 0.26%.

Sample 7 was made by the process described in Example VII where 0.01% epichlorohydrin was reacted with waxy corn starch for four hours followed by addition and reaction with quaternary ammonium cationizing reagent (5.0% dry basis on starch).

All of the crosslinked, cationic starches were cooked using a laboratory mini-jet cooker as described in Example I. Samples were evaluated for calcium carbonate retention using 10 lbs/ton addition levels and the dynamic retention test described in Example I and the % Breakdown Viscosity as described below.

The crosslinked cationic starches were measured for viscosity using a C. W. Brabender viscoamylograph and the % Breakdown Viscosity determined as follows. The starches were evaluated using a 700 cmg cartridge and a rapid heating rate from room temperature to 95° C. Starch sample (23.0 g), 30 ml of an aqueous solution of citric acid monohydrate (prepared by diluting 210.2 g of citric acid monohydrate to 1000 ml in a volumetric flask) and enough water to make the total charge weight 460.0 g are slurried together and added to the cooking chamber of the viscoamylograph. The key viscosity data for controlling the crosslinked cationic starches are the peak viscosity (highest viscosity observed on the viscosity curve recorded on the cart recorder of the viscoamylograph) and the final viscosity (viscosity at 95° C. +30 minutes). The % breakdown is calculated based on the following equation:

$$\% \text{ Breakdown Viscosity} = \frac{\text{Peak Viscosity} - \text{Viscosity @ 95° C. after 30 minutes}}{\text{Peak Viscosity}} \times 100$$

The results for calcium carbonate retention and breakdown viscosity are shown in Tables 3 and 4.

TABLE 3

| SAMPLE[1] | % EPI-CHLOROHYDRIN CROSS-LINKING | % CALCIUM CARBONATE RETENTION | % OF CONTROL[2] | % BREAKDOWN VISCOSITY |
|---|---|---|---|---|
| 1 | 0.0001 | 15.8 | 107 | — |
| 2 | 0.0005 | 16.8 | 106 | — |
| 3 | 0.001 | 16.4 | 112 | 93 |
| 4 | 0.004 | 20.2 | 127 | 56 |
| 5 | 0.006 | 23.7 | 161 | 48 |
| 6 | 0.009 | 22.4 | 141 | 26 |
| 7 | 0.01 | 27.7 | 178 | 26 |
| 8 | 0.012 | 23.4 | 159 | 33 |
| 9 | 0.015 | 19.0 | 120 | 35 |
| 10 | 0.02 | 19.3 | 131 | 17 |
| 11 | 0.02 | 25.8 | 157 | 2 |
| 12 | 0.03 | 17.4 | 106 | NA |
| 13 | 0.04 | 14.8 | 90 | NA |
| 14 | 0.05 | 13.4 | 82 | NA |
| 15 | 0.06 | 13.8 | 84 | NA |
| 16 | 0.07 | 14.8 | 90 | NA |
| 17 | 0.08 | 13.1 | 80 | NA |
| 18 | 0.09 | 14.6 | 89 | NA |
| 19 | 0.10 | 9.0 | 57 | NA |

[1]Note: Samples 1–6, 8–10 and 19 were evaluated in the same run vs. control, while samples 7 and 11–18 were evaluated in separate runs but vs. the same control.
[2]Control was a quaternary ammonium waxy corn starch containing 0.3% cationic nitrogen

TABLE 4

| SAMPLE | % epi | PEAK VISC. | 95° C. | 95° C. + 10' | 95° C. + 20' | 95° C. + 30' | % BREAKDOWN VISCOSITY |
|---|---|---|---|---|---|---|---|
| 3 | 0.001 | 990 | 680 | 320 | 140 | 70 | 93 |
| 4 | 0.004 | 990 | 830 | 640 | 530 | 440 | 56 |
| 5 | 0.006 | 990 | 840 | 700 | 600 | 510 | 48 |
| 6 | 0.009 | 770 | 750 | 690 | 630 | 570 | 26 |
| 7 | 0.01 | 850 | 840 | 730 | 650 | 570 | 33 |
| 8 | 0.12 | 770 | 740 | 700 | 660 | 500 | 35 |
| 9 | 0.15 | 730 | 700 | 680 | 660 | 620 | 15 |
| 10 | 0.02 | 630 | 630 | 640 | 630 | 620 | 2 |
| 11 | 0.02 | 590 | 580 | 590 | 590 | 580 | 2 |
| 12 | 0.03 | — | 480 | 540 | 560 | 560 | NA |
| 13 | 0.04 | — | 400 | 480 | 510 | 520 | NA |
| 14 | 0.05 | — | 280 | 400 | 450 | 480 | NA |
| 15 | 0.06 | — | 240 | 360 | 410 | 450 | NA |
| 16 | 0.07 | — | 130 | 270 | 350 | 410 | NA |
| 17 | 0.08 | — | 90 | 220 | 300 | 350 | NA |
| 18 | 0.09 | — | 70 | 160 | 230 | 280 | NA |

Samples reacted with 0.001 to 0.02% epichlorohydrin showed improved results vs. a non-crosslinked quaternary ammonium waxy corn starch. Note that samples 10 and 11 used the same amount of epichlorohydrin but different reaction sequence yet both samples showed improved performance. The amount of crosslinking is most critical for performance and can be related to the % breakdown viscosity described below.

The % breakdown viscosity decreased as the % crosslinking increases. Higher amounts of covalent crosslinking on the starch granule reinforces the granular structure and prevents collapse of the starch granular structure and, hence, viscosity loss (i.e., less breakdown). In fact, when the amount of crosslinking on the starch reaches a certain level, cooking of the starch becomes more difficult and no peak viscosity is observed as well as minimal viscosity development. This can be seen in the viscosity table. When the amount of epichlorohydrin treatment is 0.03% or greater, a continually increasing viscosity curve is obtained. Even with jet cooking, the performance of these latter samples (those crosslinked with 0.03% epichlorohydrin or greater) is at best equal to but generally less than that of the uncrosslinked cationic starch control. Crosslinked cationic starches that show the best performance in alkaline papermaking are those that produce a viscoamylograph curve using the above buffered procedures with a peak viscosity and about 2–60% breakdown viscosity.

EXAMPLE IV

Several samples were run to show the importance of the cooking method and crosslinking. Quaternary ammonium corn starch and quaternary ammonium waxy maize prepared as in Examples I and II were crosslinked with 0.006% epichlorohydrin. The starches were cooked using the boiling water bath (BWB) and mini-jet cooker (Jet) conditions as described in Examples I and II. The same base cationic corn starches but without being crosslinked were also cooked in the same manner and tested for retention as shown in the previous examples. Results are shown below in Table 5.

TABLE 5

| SAM-PLE | STARCH BASE[2] | % EPI-CHLORO-HYDRIN | COOK TYPE | % PCC RETEN-TION | % of CON-TROL |
|---|---|---|---|---|---|
| Control[1] | Waxy Maize | None | Jet | 17.4 | 100 |
| A | Corn | None | BWB | 18.1 | 104 |
| A-1 | Corn | None | Jet | 17.5 | 101 |
| A-2 | Corn | 0.006 | BWB | 16.2 | 93 |
| A-3 | Corn | 0.006 | Jet | 22.7 | 131 |
| B | Waxy Maize | None | BWB | 18.7 | 107 |
| B-1 | Waxy Maize | None | Jet | 17.1 | 98 |
| B-2 | Waxy Maize | 0.006 | EWB | 18.4 | 106 |
| B-3 | Waxy Maize | 0.006 | Jet | 24.3 | 140 |

[1]Control is a commercially available cationic quaternary waxy maize.
[2]All starches contained a cationic group.

The results show first of all that crosslinking did not improve the performance of either the cationic corn or the cationic waxy maize when the starches were cooked in the boiling water bath (BWB). It can also be observed that the normal cationic corn and the cationic waxy maize did not improve upon jet cooking. In fact, there appears to be a reduction in performance when using the normal cationic starches that were jet cooked over the same starches that were cooked in the boiling water bath.

When observing the crosslinked, cationic starches, both showed significant improvement when jet cooked. This illustrates the unique benefit of using both crosslinking and jet cooking in preparing the starch material.

EXAMPLE V

This example further shows and compares the effect of cooking method on commercially available cationic and amphoteric starches. The cooking methods, i.e., boiling water bath (BWB) and mini-jet cooking (Jet) were as described in Examples I and II and the retention (% PCC) was also determined using the test described in the previous examples. The results are shown below in Table 6.

TABLE 6

| SAM-PLE | STARCH BASE | COOK TYPE | % PCC RETEN-TION | % OF CON-TROL |
|---|---|---|---|---|
| A (Control) | Waxy Maize (Cationic) | BWB | 22.0 | 100 |
| A-1 | Waxy Maize (Cationic) | Jet | 23.4 | 106 |
| B | Corn (Cationic) | BWB | 21.5 | 98 |
| B-1 | Corn (Cationic) | Jet | 21.3 | 97 |
| C | Potato (Cationic) | BWB | 35.2 | 160 |
| C-1 | Potato (Cationic) | Jet | 30.4 | 136 |
| D | Tapioca (Cationic) | BWB | 28.0 | 127 |
| D-1 | Tapioca (Cationic) | Jet | 27.5 | 125 |
| E | Waxy Maize (Amphoteric) | BWB | 34.8 | 158 |
| E-1 | Waxy Maize (Amphoteric) | Jet | 33.3 | 151 |

The results show that while there is a difference in performance with the different starch samples, there is no tendency toward improvement of jet cooked starch relative to the boiling water bath (BWB) cooked starch for these non-crosslinked starches.

EXAMPLE VI

A pilot quantity of crosslinked cationic starch was prepared as follows. Waxy corn (2000 lbs) was slurried in 3000 lbs. of water and maintained at 105°–110° F. One hundred fifty-four (154) lbs. of a 65% solution of (3-chloro-2-hydroxypropyl) trimethylammonium chloride (quat. reagent) was added to the slurry simultaneously with 1267 lbs. of 3% sodium hydroxide solution. The reaction was allowed to proceed for four hours after addition of the quat reagent while maintaining an alkalinity titration of 35–40 ml (per 50 ml of slurry sample using 0.1N HCl). Then 63.6 g of epichlorohydrin (0.007% on starch) was added and the reaction allowed to run for 20 hours. The slurry was neutralized to 5.8 pH with 48 lbs. of concentrated HCl, centrifuged and flash dried (outlet temperature 170° F.) to about 10–12% moisture. The product identified as CBD-1 contained 0.30% nitrogen.

Viscosity analysis of CBD-1 was run using a C. W. Brabender Viscoamylograph as in Example III. Anhydrous starch (23 g) was slurried with 20 g of sodium citrate solution (52.55 g citric acid monohydrate dihydrate dissolved in water in a 250 ml volumetric flask) and enough water to bring the total charge weight to 460.0 g. The viscosity results are shown below:

| | Viscosity Profile | | | |
|---|---|---|---|---|
| | Peak | 95° C. | 95° C. + 30 Minutes | % Breakdown |
| CBD-1 | 860 | 820 | 520 | 40% |

The % precipitated calcium carbonate retention was determined using an alkaline dynamic retention test as in Example I with the following results:

|  | % PCC Retention | % of Control |
|---|---|---|
| Control[1] | 14.7 | 100 |
| CBD-1 (BWB)[2] | 16.3 | 111 |
| CBD-1 (Jet)[3] | 26.3 | 179 |

[1] Control is quaternary ammonium waxy corn starch
[2] BWE - Boiling water bath - starch was cooked at 1% solids in a boiling water bath at 95–110° C. for 20 minutes
[3] starch was cooked in a mini jet cooker at 220° F.

The CBD-1 sample was further tested in a National Starch and Chemical C-80 commercial jet cooker. Conditions were: temperature (195°–250° F.), chamber solids (3–7%), final cook solids (1.5–7%), starch flow rate 10 gal/min and chamber capacity 1.3 gal. The viscosity is a Brookfield viscosity determined using Brookfield RV viscometer, model no. TDV-11, spindle no. 5 at 20 rpm and at room temperature (72° F.). The starch was typically slurried at a high solids of about 30 to 32% and was pumped to the jet cooker where the solids entering the cook chamber was adjusted to about 4 to 6% by dilution with cold water. Each cooked starch was evaluated in alkaline dynamic retention as in Example I with the following results.

hundred (200) g of the dry (10–12% moisture) crosslinked waxy corn starch was mixed with 0.1% silica in a Hobart mixer. A reagent solution was prepared by mixing 13.78 g of a 65.3% aqueous solution of (3-chloro-2-hydroxypropyl) trimethylammonium chloride and 12.96 g of a 21.6% sodium hydroxide solution. The solution was immediately sprayed onto the dry starch and mixing was allowed to continue for 0.5 hour. The mixture was allowed to react at room temperature for three days. Nitrogen analysis of a water washed sampled yielded 0.32% nitrogen. The sample was evaluated in alkaline dynamic pigment retention with the following results:

| Sample[1] | % Calcium Carbonate Retention | % of Control |
|---|---|---|
| A (BWB) | 15.5 | 95 |
| B (Jet) | 23.5 | 145 |
| Control[2] | 16.2 | 100 |

[1] Samples were cooked BWB, jet as in examples I and II.
[2] Control is quaternary ammonium waxy corn starch.

This example illustrates that dry cationization of crosslinked starch is effective in producing a crosslinked cationic starch for use in papermaking.

TABLE 7

| SAMPLE # | CHAMBER SOLIDS | (°F.) TEMP. | FINAL SOLIDS | (cps) VISCOSITY | % CALCIUM CARBONATE RETENTION | % OF CONTROL |
|---|---|---|---|---|---|---|
| FIRST RUN: | | | | | | |
| 1 | 3.0 | 205 | 3.4 | 3,160 | 24.2 | 152 |
| 2 | 3.0 | 230 | 3.3 | 2,960 | 24.0 | 151 |
| 3 | 3.0 | 250 | 1.6 | 500 | 24.7 | 155 |
| 4 | 3.0 | 205 | 1.9 | 280 | 21.3 | 134 |
| 5 | 7.0 | 230 | 1.8 | 650 | 19.9 | 125 |
| 6 | 7.0 | 205 | 1.6 | 640 | 21.4 | 135 |
| 7 | 7.0 | 250 | 3.7 | 8,500 | 25.0 | 157 |
| 8 | 7.0 | 205 | 4.4 | 19,400 | 20.0 | 126 |
| 9 | 7.0 | 250 | 4.8 | 13,000 | 21.5 | 135 |
| 10 | 7.0 | 195 | 2.3 | 2,560 | 20.8 | 131 |
| 11 | Mini Jet Cook | 220 | 3.3 | 5,200 | 23.9 | 150 |
| Control | Mini Jet Cook | 220 | 3.1 | 460 | 15.9 | 100 |
| SECOND RUN: | | | | | | |
| 1 | 7.0 | 215 | 5.4 | 23,600 | 20.4 | 132 |
| 2 | 7.6 | 215 | 2.8 | 2,340 | 20.0 | 129 |
| 3 | 7.0 | 250 | 4.2 | 2,200 | 19.4 | 125 |
| 4 | 7.0 | 250 | 7.1 | 13,500 | 22.1 | 143 |
| 5 | 3.0 | 215 | 2.7 | 2,100 | 22.0 | 143 |
| 6 | 3.0 | 215 | 5.3 | 5,000 | 22.0 | 143 |
| 7 | 3.0 | 250 | 2.7 | 1,100 | 23.4 | 151 |
| 8 | 3.0 | 250 | 4.7 | 4,200 | 25.5 | 165 |
| 9 | 3.0 | 250 | 2.8 | 800 | 22.0 | 143 |
| 10 | Mini Jet Cook | 970 | 2.8 | 2,800 | 26.9 | 174 |
| Control | Mini Jet Cook | 220 | 2.0 | 240 | 15.5 | 100 |

All samples are CBD-1 except for control which is a non-crosslinked quaternary ammonium waxy corn starch.

The results illustrate that a wide range of cooking conditions can be used in order to achieve significant pigment retention performance. Best conditions were at 3–5% chamber solids, 215°–230° F., and a final cook solids of 4% or less (for ease of handling).

EXAMPLE VII

Waxy corn was reacted with 0.006% epichlorohydrin using the general procedures described in Example I. Two

EXAMPLE VIII

This example illustrates that crosslinking can be used to improve the performance of amphoteric starches as wet end additives in papermaking.

One hundred-fifty (150) g of CBD-1, a crosslinked, cationic starch prepared as described in Example IV, was slurried in 2,250 ml of water. Fifteen (15) g of sodium tripolyphosphate was added to the slurry and the pH was adjusted to 7.5 with 10% HCl solution. The starch was filtered and dried in a laboratory flash drier (inlet temperature 220° F., outlet temperature 160° F., speed 4) to 4.5% moisture. The starch was placed in a preheated jacketed vessel with a mechanical stirrer (jacket temperature 351° F.). When the starch reached 311° F. (15–20 minutes), the starch was immediately discharged from the vessel and cooled. Total phosphorus content was 0.20%. A portion of the sample was slurried in water, filtered and extensively washed with water. Phosphorus analyses on this sample (A) yielded 0.06% P. This was the amount of phosphorus covalently bonded to the starch as monoester phosphate groups. Another sample was prepared using the identical procedure except 30 g of sodium tripolyphosphate was used. This sample (B) had 0.32% of total phosphorus and 0.10% bound phosphorus.

Another amphoteric starch was prepared by reacting CBD-1 (Example IV) with an aminophosphonate reagent, N-(2-chloroethyliminobis(methylene)diphosphonic acid) or CMPA. One thousand (1,000) g of CBD-1 was slurried in 1,500 ml of water. Three hundred (300) g of sodium sulfate was dissolved in the slurry and 200 g of 4% sodium hydroxide solution added to raise the pH to 11.5–11.7. Twenty (20) g of CMPA was added while maintaining the pH at 11.5–11.7 with additional 4% NaOH. The reaction was allowed to react 16 hours at 40° C. (104° F.). The reaction was neutralized with HCl to 8.0 pH, filtered, washed on the cake with 2,000 ml of water and dried. This sample (C) had 0.42% P due to the aminophosphonate groups. Evaluation of the crosslinked amphoteric starches in alkaline dynamic retention gave the following results:

TABLE 8

| SAMPLE | % EPICHLORO-HYDRIN CROSSLINKING | % CALCIUM CARBONATE RETENTION | % OF CONTROL |
|---|---|---|---|
| Control-1[1] | — | 23.1 | 100 |
| A | 0.007 | 29.9 | 130 |
| B | 0.007 | 27.3 | 118 |
| Control-2[2] | — | 30.4 | 132 |
| C | 0.007 | 35.0 | 152 |
| CBD-1[3] | 0.007 | 25.9 | 112 |

[1]Control is commercial amphoteric starch based on quaternary ammonium waxy corn starch reacted with sodium tripolyphosphate to contain 0.06% phosphorus
[2]Control is quaternary ammonium waxy corn starch reacted with CMPA (aminophosphonate reagent) to about 0.48% P
[3]CBD-1 is pilot batch of crosslinked quaternary ammonium waxy corn starch described in Example VI The results show the crosslinked, amphoteric starches (sodium tripolyphosphate) A and B had improved performance over a comparable commercial amphoteric starch Control-1. Likewise, the crosslinked aminophosphonate amphoteric starch (C) showed improved retention over the non-crosslinked version, Control-2.

EXAMPLE IX

Several samples were run to show the effect of varying the sequence of the cationization and crosslinking reactions.

Using the following general procedure several starch reactions run with varying amounts of epichlorohydrin and with the crosslinking reaction completed before the cationization. Three hundred (300) g of waxy corn starch was slurried in 450 ml. water. Forty-five (45) g of 4% sodium hydroxide was added followed by 0.002, 0.004 or 0.006% epichlorohydrin (by weight on starch). The reactions were allowed to run for 20 hours at 40° C. Then, 21.63 g of a 65.2% aqueous solution of (3-chloro-2-hydroxypropyl) trimethylammonium chloride was added with additional 4% sodium hydroxide to maintain 11.5 pH and the reaction allowed to proceed another 20 hours. Samples were worked up as described in previous examples and evaluated for alkaline dynamic retention with the results shown in the following table (samples A, B, C.).

TABLE 9

| SAMPLE | % EPICHLORO-HYDRIN | % CALCIUM CARBONATE RETENTION | % OF CONTROL |
|---|---|---|---|
| A | 0.002 | 19.1 | 154 |
| B | 0.004 | 19.6 | 158 |
| C | 0.006 | 23.6 | 191 |
| Control[1] | — | 12.4 | 100 |

[1]Control = quaternary ammonium waxy corn starch

Another sample was prepared by slurrying 100 g of waxy corn starch in 150 parts water, adding 20 g of 3% sodium hydroxide and heating to a temperature of 40°–46° C. Epichlorohydrin (0.006% in starch) was added and reacted for four hours. Then 7.7 g of a 65% (3-chloro-2-hydroxypropyl) trimethylammonium chloride solution and 5.3 g of sodium hydroxide were mixed in line and simultaneously added to the starch slurry. Reaction was allowed to run 16 hours followed by a work up as described above. The product contained 0.31% nitrogen and was identified as sample D. It was compared with CBD-1 of Example VI and one described above (C) in alkaline pigment retention as shown below:

| Sample | % Calcium Carbonate Retention | % of Control |
|---|---|---|
| D | 25.2 | 101 |
| CBD-1 | 25.0 | 100 (control) |
| C | 23.1 | 93 |

Clearly, the crosslinked cationic starches made using varied reaction sequence are essentially equivalent.

EXAMPLE X

A series of samples were prepared using the procedure described for sample D in Example IX. Either 0.006% or 0.01% epichlorohydrin was reacted with waxy starch along with varying amounts of quaternary ammonium cationizing reagent: 3.1%, 3.9% and 4.7% dry basis on starch to yield about 0.2, 0.26 and 0.31% cationic nitrogen, respectively. The starches with varying crosslinking and cationic nitrogen were either boiling water bath cooked [BWB; 100° C. (212° F.)], 20 minutes) or jet-cooked as in Example I and performance was evaluated in the alkaline retention test described in Example I. Results are listed below:

| SAMPLE | % epi | % N | % CACO₃ Retention | | % of Control | | % Breakdown Viscosity |
|---|---|---|---|---|---|---|---|
| | | | BWB | JET COOKED | BWB | JET COOKED | |
| 1 | — | 0.31 | 16.2 | — | Control = 100 | — | 97 |
| 2 | 0.01 | 0.20 | 13.0 | 22.7 | 80 | 141 | 30 |
| 3 | 0.01 | 0.26 | 12.5 | 22.3 | 77 | 138 | 33 |
| 4 | 0.01 | 0.31 | 13.8 | 26.1 | 86 | 161 | 35 |
| 5 | 0.006 | 0.26 | 17.8 | 26.4 | 107 | 163 | 48 |
| 6 | 0.006 | 0.31 | 17.6 | 24.5 | 109 | 151 | 51 |

The crosslinked cationic starches with the higher level of crosslinking showed significantly lower performance when the samples were boiling water bath cooked. A modest increase in performance over the control (quaternary ammonium waxy corn starch) was observed with the lower crosslinking when the 0.006% epi-treated starches were boiling water bath cooked. All the crosslinked cationic starches showed superior performance when the starches were dispersed by jet-cooking.

Retention evaluations comparing sample 4 with the control and using both boiling water bath cooked and jet-cooked starches were repeated with results shown below. Sample 4 yielded 95% of the cationic waxy corn starch control when both samples were boiling water bath cooked; when jet-cooked dispersions were run in the evaluation, sample 4 yielded 150% of the control's performance. The performance of the non-crosslinked cationic waxy corn starch control stayed relatively constant with either the boiling water bath or jet-cooking.

| SAMPLE | COOKING | % CaCO₃ RETENTION | % OF CONTROL |
|---|---|---|---|
| Control | BWB | 22.0 | 100 |
| 4 | BWB | 21.0 | 95 |
| Control | Jet-cooking | 23.4 | 100 |
| 4 | Jet-cooking | 35.0 | 150 |

EXAMPLE XI

This example illustrates the uses of other crosslinking agents.

Adipic-acetic Mixed Anhydride:

Waxy corn starch (1000 g) was slurried in 1500 ml of water and 8 g of sodium hydroxide, as a 3% aqueous solution by weight, was added to the slurry while raising the temperature to 43° C. (110° F.). A 65% aqueous solution of (3-chloro-2-hydroxypropyl) trimethylammonium chloride (7.7 g) was added along with additional 3% sodium hydroxide to maintain 11.3–11.7 pH. Reaction was maintained at 43° C. for 20 hours. At that point the reaction was cooled to 23°–25° C. and the pH was lowered to 8.0 with 10% hydrochloric acid. While maintaining 7.8–8.2 pH with periodic addition of 3% sodium hydroxide, 3.5 g (0.35% on starch) of adipic-acetic mixed anhydride reagent (prepared by mixing 1 part of adipic acid with 9.0 parts of acetic anhydride and heating at 90° C. for one hour) was added over 15–20 minutes. The reaction was held for an additional 15–30 minutes and, then, the slurry was adjusted to 5.8–6.8 pH with 10% hydrochloric acid, filtered, washed and dried. This sample was labeled A. An additional sample was prepared using 0.25% adipic-acetic mixed anhydride and the procedure described above. This sample was identified as B. Following is a summary of the evaluation data.

| SAMPLE[1] | % BREAKDOWN VISCOSITY | % CALCIUM CARBONATE RETENTION | % OF CONTROL[2] |
|---|---|---|---|
| A | 44 | 21.3 | 130 |
| B | 35 | 23.1 | 142 |

[1] Samples were jet-cooked as described in previous examples.
[2] Quaternary ammonium waxy corn starch Phosphorus Oxychloride (POCl₃):

Waxy corn starch was reacted with the quaternary ammonium reagent as described above. After the 20 hour reaction period with the cationizing reagent the reactions were cooled to 30° C. and the pH was maintained at 11.3–11.5. The reaction was split into two equal parts; 0.001% by weight phosphorus oxychloride (based on dry weight of starch in the slurry) was added to one portion and 0.003% phosphorus oxychloride was added to the second portion. The reactions were run 30 minutes after POCl₃ addition at 30° C. and 11.3–11.5 pH. This was followed by neutralization to 5.8–6.8 pH and work-up as described above. Sample evaluations are listed below.

| SAMPLE | % BREAKDOWN VISCOSITY | % CALCIUM CARBONATE RETENTION | % OF CONTROL |
|---|---|---|---|
| Control[1] | 97 | 17.9 | 100 |
| 0.001% POCl₃ | 76 | 25.8 | 144 |
| 0.003 POCl₃ | 41 | 25.4 | 142 |

Sodium Hypochlorite

A cationic waxy corn starch was prepared as described above in Example II. While maintaining the starch at 11.5 pH after completion of the cationizing reaction, 0.1% sodium hypochlorite, based on weight of starch was added and allowed to react at 35° C. until no residual hypochlorite was detected (via a spot test using several drops of starch slurry, followed by several drops of 10% HCl and then some 10% potassium iodide; a dark to slightly yellow color is positive and white is negative, no hypochlorite remaining). Work-up was the same as described above.

A cationic waxy starch treated as above yielded 83% breakdown viscosity and 112% of the untreated cationic starch, alkaline retention.

EXAMPLE XII

This example illustrates that the crosslinked cationic starches of this invention provide unexpected performance improvement over non-crosslinked starches in microparticle wet end systems.

Two samples of crosslinked, cationic starches were used. Sample 1 was a crosslinked (0.006% epichlorohydrin), quaternary waxy maize starch similar to that of Example VI, Sample 2 was a crosslinked (0.01% epichlorohydrin), quaternary waxy maize starch prepared as in Example IV. Both crosslinked starch samples were cooked in a mini jet cooker as in Example I.

The testing was conducted in an actual fine paper mill using papermachine stock made to simulate the furnish running on the actual papermachine at the time. The papermachine is a Top Former, running 900–1800 FPM depending on the basis weight. The furnish was composed of 75–80% Bleached Hardwood Kraft Pulp, 20–25% Bleached Softwood Kraft Pulp and up to 30% coated broke. The paper grades made were generally #1 and #2 high quality coated paper, ranging from 50–180 lbs/3300 square feet when coated.

The wet end chemical additive system consisted of the following: 10–15% precipitated calcium carbonate (PCC) added in the machine chest followed by about 35 lbs/ton of starch added at the machine chest outlet transfer pump (both "thickstock" addition), and then 1.5–3.0 lbs per ton of colloidal silica added at outlet of the screen ("thinstock" addition).

Evaluations were made for first pass retention (FPR) using the Tappi procedure T261 pm-80 and for PCC retention (Ash Retention) using the Tappi procedure T413 om-85. The results are as follows.

| STARCH | FPR (% STD) | ASH RETENTION (% STD) |
|---|---|---|
| Control[1] | 74.0 (100) | 46.1 (100) |
| Cationic Potato | 80.4 (109) | 56.9 (123) |
| Sample 1 | 78.3 (106) | 63.3 (137) |
| Sample 2 | 75.4 (102) | 60.1 (130) |

[1]Control = quaternary ammonium waxy maize starch

EXAMPLE XIII

This example further illustrates the use of crosslinked, cationic starches of this invention in microparticle wet end systems.

A crosslinked (0.006% epichlorohydrin) quaternary waxy maize starch similar to that prepared in Example VI was used and cooked in a mini-jet cooker as described in Example I (sample 1) as well as another sample (sample 2), prepared in a similar manner but containing a slightly greater amount of crosslinking (0.01% epi). The testing was conducted on paper made in an alkaline fine paper mill using a Fourdrinier machine running at 1000–1200 FPM. The furnish was composed of 60% Bleached Hardwood Kraft Pulp, 40% Bleached Softwood Kraft Pulp with up to about 30% coated broke added to the stock mixture. The grades manufactured were #1 and #2 high and medium quality coated grades, from 50 to 120 lbs. per 3300 square feet (final coated weight).

The wet end additive system consisted of the following: 5.5 lbs. per ton of dilute papermakers alum added to the top of the machine chest; about 28 lbs. per ton of starch added to the stuff box; about 2.5 lbs of AKD size added also to the stuff box with the starch; followed in sequence by 10% PCC and 6% titanium dioxide on the weight of fiber, added at the fan pump, next an additional 3.5 lbs/ton of alum was added at the outlet of the cleaner, followed by 1.5 lbs/ton of colloidal silica at the inlet of the screen and finally 0.50 lbs/ton (day basis) of anionic retention aid was added at outlet of the screen.

The samples were evaluated for first pass retention (FPR) and calcium carbonate retention (Ash Ret) as in Example XII with the following results:

| STARCH | FPR (% CONTROL) | ASH RET (% CONTROL) |
|---|---|---|
| Control[1] | 90.6 (100) | 61.6 (100) |
| Cationic Potato | 93.7 (103) | 73.7 (119) |
| Sample 1 | 97.6 (108) | 93.6 (151) |
| Sample 2 | 98.9 (109) | 93.9 (152) |

[1]Control = quaternary ammonium waxy maize starch

As clearly indicated in the results, the crosslinked starches showed significant improvement in performance, particularly PCC or Ash Retention relative to the non-crosslinked control sample and also the cationic potato (current mill standard wet end starch).

EXAMPLE XIV

This example further illustrates the use of crosslinked, cationic starches of this invention in microparticle wet end systems. Crosslinked starches (samples 1 and 2) and controls as described in Example XIII were used. Testing was conducted using the standard alkaline papermaking furnish as described in Example I. The pH was 7.8, total fines was 46.2% and calcium carbonate (PCC) was 25.7%.

The test was made using the Britt Jar as described in Example I. In this evaluation, a high molecular weight cationic polyacrylamide retention aid (1.7 lbs/ton) was added in the thickstock addition simulation before high shear mixing occurred. Starch was added in an amount of 15 lbs/ton to the thickstock also prior to increasing mixing in the jar. Finally, 3 lbs/ton of Bentonite was added to the thinstock just prior to starting the drain to begin sample collection.

The samples were evaluated for first pass retention (FPR) as described in Example XIII and PCC retention (Ash Retention) as described in Example I. The results are as follows:

| STARCH | FPR (% CONTROL) | ASH RETENTION (% CONTROL) |
|---|---|---|
| Control[1] | 76.0 (100) | 38.0 (100) |
| Cationic Potato | 77.5 (102) | 36.0 (94.7) |
| Sample 1 | 79.9 (105) | 55.5 (146) |
| Sample 2 | 83.1 (109) | 58.7 (154) |

[1]Control - quaternary ammonium waxy maize starch.

The crosslinked cationic waxy maize samples (1 and 2) both showed significantly improved performance particularly in PCC or ash retention relative to the control and standard cationic potato starch.

What is claimed is:

1. A crosslinked, cationized or amphoteric starch composition for use in papermaking comprising a cationized or amphoteric starch which is crosslinked by adding enough crosslinking agent to provide a starch having a breakdown viscosity of from about 2 to 85% wherein the crosslinked, cationized or amphoteric starch is jet cooked at a temperature of from about 195° to 325° F. under super atmospheric pressure.

2. The starch composition of claim 1 wherein the starch is crosslinked with an agent selected from the group consisting of epichlorohydrin, phosphorus oxychloride, trimetaphosphates, mixed anhydrides of acetic and di- or tribasic acids, and sodium hypochlorite.

3. The starch composition of claim 2 wherein the starch is a crosslinked, cationic starch.

4. The starch composition of claim 3 wherein the starch is cationized with a tertiary amino or quaternary ammonium ether group.

5. The starch composition of claim 4 wherein the starch is crosslinked with epichlorohydrin.

6. The starch composition of claim 5 wherein the starch is crosslinked to a breakdown viscosity of from about 2 to 60 percent.

7. The starch composition of claim 5 wherein the starch has been jet cooked at a temperature of from about 220° to 250° F. at a pressure of at least 15 psi.

8. The starch composition of claim 1 wherein the composition further comprises an alkali microparticle system containing colloidal inorganic minerals selected from the group consisting of colloidal silica, bentonite and anionic alum.

\* \* \* \* \*